(12) United States Patent
Vu et al.

(10) Patent No.: US 11,199,442 B2
(45) Date of Patent: Dec. 14, 2021

(54) AMBIENT LIGHT DETECTOR, DETECTOR ARRAY AND METHOD

(71) Applicant: OSRAM Opto Semiconductors GmbH, Regensburg (DE)

(72) Inventors: Hoa Vu, Milpitas, CA (US); Andrey Lysov, Regensburg (DE)

(73) Assignee: OSRAM OPTO SEMICONDUCTORS GMBH, Regensburg (DE)

( * ) Notice: Subject to any disclaimer, the term of this patent is extended or adjusted under 35 U.S.C. 154(b) by 9 days.

(21) Appl. No.: 16/990,536

(22) Filed: Aug. 11, 2020

(65) Prior Publication Data

US 2020/0370953 A1 Nov. 26, 2020

Related U.S. Application Data

(62) Division of application No. 16/024,437, filed on Jun. 29, 2018, now Pat. No. 10,852,182.

(51) Int. Cl.
*G01J 1/42* (2006.01)
*H05B 47/11* (2020.01)
*G01J 1/32* (2006.01)
*G01J 1/44* (2006.01)

(52) U.S. Cl.
CPC ........... *G01J 1/4204* (2013.01); *G01J 1/32* (2013.01); *G01J 1/44* (2013.01); *H05B 47/11* (2020.01); *G01J 2001/446* (2013.01)

(58) Field of Classification Search
CPC .... G01J 1/4204; G01J 1/32; G01J 1/44; G01J 2001/446; G01J 2001/1663; G01J 2001/4406; G01J 1/1626; G01J 1/18; G01J 1/0437; G01J 1/4228; H05B 47/11; Y02B 20/40
See application file for complete search history.

(56) References Cited

U.S. PATENT DOCUMENTS 6,194,703 B1 2/2001 Kuderer
6,614,562 B1 9/2003 Minemier
(Continued)

OTHER PUBLICATIONS

Vignetti, M.M. et al., "Design guidelines for the integration of Geiger-mode avalanche diodes in standard CMOS technologies," Microelectronics Journal, Aug. 24, 2015, 11 pages.
(Continued)

*Primary Examiner* — Seung C Sohn
(74) *Attorney, Agent, or Firm* — Slater Matsil, LLP

(57) ABSTRACT

An ambient light detector, a detector array and a method are disclosed. An ambient light sensor includes a first plurality of sensor elements, where each sensor element is configured to provide a signal in response to a level of illumination and a second plurality of reference elements, each reference element configured to provide a reference signal and each including a blocking element configured to shield the respective reference element from being illuminated, where the first plurality is larger than the second plurality and the first plurality of sensor elements and the second plurality of reference elements are arranged in an array, and where a sensor element and a reference element are laterally arranged on or in a common layer substrate sharing at least one common first contact.

20 Claims, 4 Drawing Sheets

(56) References Cited

U.S. PATENT DOCUMENTS

| | | | |
|---|---|---|---|
| 7,531,776 B2* | 5/2009 | Koide | G01J 1/4204 |
| | | | 250/205 |
| 8,309,901 B2* | 11/2012 | Satoh | G01J 1/4228 |
| | | | 250/214 AL |
| 9,001,095 B2 | 4/2015 | Park et al. | |
| 2004/0017419 A1 | 9/2004 | Simon | |
| 2007/0273775 A1 | 11/2007 | Jiang | |
| 2012/0049048 A1 | 3/2012 | Dyer | |
| 2014/0353471 A1 | 12/2014 | Raynor et al. | |
| 2015/0338269 A1 | 11/2015 | Frank et al. | |
| 2017/0041564 A1 | 2/2017 | Konstantatos et al. | |

OTHER PUBLICATIONS

Lin, W.S. et al., "High Performance CMOS Light Detector with Dark Current Suppression in Variable-Temperature Systems," Sensors, 2017, published Dec. 23, 2016, 2016, 12 pages.

Atef, M., "Intergrated Photodiodes in Nanometer CMOS Technolgies," Electrical and Electronics Engineering: An International Journal (ELELIJ), vol. 3, No. 2, May 2014, 20 pages.

* cited by examiner

AMBIENT LIGHT DETECTOR, DETECTOR ARRAY AND METHOD

PRIORITY CLAIM AND CROSS-REFERENCE

This application is a divisional of U.S. patent application Ser. No. 16/024,437, entitled "Ambient Light Detector, Detector Array and Method," filed Jun. 29, 2018, which application is hereby incorporated herein by reference.

TECHNICAL FIELD

The present application concerns an ambient light detector. The application also refers to an ambient light detector, a detector array and a method of forming an ambient light sensor.

BACKGROUND

An Ambient Light Sensor (ALS) is an electronic device that measures intensity of an ambient illumination and outputs an electrical signal proportional to the level of illumination. The output may then be used to control the strength or colour temperature of a lighting device. An ALS may include a photodiode array and a current amplifier.

Dark current is the relatively small electric current that flows through photosensitive devices, such as photodiodes, even when no photons are entering the device. The dark current consists of charge carriers generated in the detector when the detector is not illuminated by incoming light. It is a temperature depending characteristics of semiconductors. The dark current can be increased by heating of the photodiodes and correspondingly reduced when the diode is cooled down.

To provide better measurement result with ambient light sensor, it is desirable to reduce the impact of dark current in such sensors.

SUMMARY

Embodiments provide an ambient light sensor with improved dark current compensation. In an aspect, the ambient light sensor comprises a first plurality of sensor elements, each sensor element configured to provide a signal when being illuminated by light. In other words, each sensor element is configured to provide a signal in response to light illumination. The sensor signal can be proportional to the illumination level. The ambient light sensor comprises a second plurality of reference elements, each reference element configured to provide a reference signal and comprising a blocking element to shield the reference element from being illuminated. The first plurality is larger than the second plurality and the first plurality of sensor elements and the second plurality of reference elements are arranged in an array. Further, a sensor element and a reference element are laterally arranged in a common substrate sharing at least one common contact.

In another aspect, an ambient light sensor, comprises a first sensor elements, each sensor element configured to provide a signal in response to a level of illumination and reference elements, each reference element configured to provide a reference signal and each reference element comprising a blocking element configured to shield the respective reference element from being illuminated. The number of sensor elements is larger than the number of reference elements. Sensor elements and reference elements are arranged in an array. A sensor element and a reference element are laterally arranged on or in a common layer substrate sharing at least one common first contact.

In an aspect, second contacts for the reference elements are arranged on a surface of the reference elements facing the blocking element. Further, second contacts for the sensor elements can be arranged on a surface of the sensor elements facing the blocking element. Alternatively, those contacts can be arranged on a surface facing away from the blocking element. In some embodiments, the common contact is arranged on a surface of the common layer substrate facing away from the blocking element. This can be for instance achieved by contact via through the common substrate.

In some embodiment, the blocking element from a top view is larger than an area occupied by the respective reference element. For instance, the blocking element may completely cover the respective reference element and further extends laterally between a space between the reference elements and an adjacent sensor element of the first plurality of sensor elements.

The blocking element may in some instances extend over a portion of a sensor element of the first plurality of sensor elements adjacent to the reference element. The portion of the sensor element covered by the blocking element may be between 5% and 50% of a total sensor area of the sensor element, and particular between 5% and 10%.

The sensor elements and the reference elements may each comprise a p-doped layer, an n-doped layer and an active area in between configured to generate the signal when being illuminated. In some other aspects, the sensor elements and/or the reference elements each comprise a well arranged in the common substrate to form an active layer between the well and the common substrate.

The number of sensor and reference elements may be different. In some embodiments, the sensor elements and the reference elements are arranged in an array, such that a ratio of sensor elements and reference elements along an edge of the array corresponds to a ratio between the first plurality and the second plurality.

In another aspect, an ambient light detector comprises a current mirror, wherein the current mirror includes a first current path and a second current path. The first current path comprises a first plurality of photodiodes and the second current path comprises a second plurality of dark current diodes. The first plurality of photodiodes and the second plurality of dark current diodes are laterally arranged in a common substrate, while the first plurality and second plurality are different.

A mirror transistor is associated with the first current path and a reference transistor is associated with the second current path. The mirror transistor and the reference transistor comprise a parameter ratio corresponding to a ratio between the first plurality and the second plurality.

In an embodiment, a compensation device for providing a compensation current in at least one of the first and second current path in response to digital mismatch compensation signal is provided. The compensation device may be connected in some aspects to the first current path between the first plurality of photodiodes and the mirror transistor and/or the compensation device is connected to the second current path between the second plurality of dark current diodes and the reference transistor.

In some aspects, an additional current limiter is configured to limit a current in the first current path. The current limiter may comprise a current sensing resistor coupled to a clamping element, said current sensing resistor configured to control a current limiting element arranged in parallel to the mirror transistor in the first current path.

Furthermore, some aspects may relate to a gain setting element to be coupled to a first signal input or to a second signal input, the second signal input being the supply input. The gain setting element is configured to set a high gain, when coupled to the first signal input and to a lower gain when coupled to the second signal input. The coupling of the gain setting element is in some aspects substantially permanent.

In some aspects, the gain setting element may comprise a gain setting transistor arranged in parallel to the mirror transistor and connected with its control input between the first plurality of photodiodes and the mirror transistor.

Another aspect concerns a photodiode of the first plurality. The photodiode may comprise a layer of a first conductivity type being arranged in or on the common substrate. A dark current diode of the second plurality may comprise a layer of a first conductivity type being arranged in or on the common substrate; wherein said common substrate having a second conductivity type. The ambient light detector may in some aspects comprise at least one common contact for a photodiode of the first plurality and for a dark current diode of the second plurality, a contact contacting the layer the photodiode and a contact contacting the layer of the dark current diode.

Each of the dark current diodes of the second plurality may comprise a blocking element configured to shield the respective dark current diode from being illuminated. In top view, the blocking element may be larger and therefore completely cover the area of the respective dark current diode and further extends laterally between a space between the dark current diode and adjacent photodiodes of the first plurality. As such, the blocking element may extend over a portion of the photodiodes of the first plurality adjacent to the dark current diode.

In some aspects, the first plurality is four times the second plurality. The photodiodes and the dark current diodes may be arranged in an array in or on the common substrate, such that a ratio of sensor elements and reference elements along an edge of the array corresponds to a ratio between the first plurality and the second plurality.

In another aspect, a light detector array comprises a first plurality of photodiodes and a second plurality of reference diodes arranged laterally to each other such that a ratio of photodiodes and reference diodes along an edge of the array corresponds to a ratio between the first plurality and the second plurality.

In some aspects, each corner of the array may comprise a photodiode of the first plurality of photodiodes. As an example, the first plurality of photodiodes is four times larger than the second plurality of photodiodes.

A further aspect is related to the forming of an ambient light sensor. In some embodiments an ambient light sensor is formed by providing a layer with a main surface and a first conductivity type. At least two areas of a second conductivity type are formed on or formed in the layer. At least two areas are formed laterally adjacent to each other and separated by the first distance. Contacts are provided to electrically contact the layer and each of the at least two areas. Further, a light shield element is provided over one of the at least two areas substantially parallel to the main surface, such that the light shield covers the one of the at least two areas and extends at least along the distance.

BRIEF DESCRIPTION OF THE DRAWINGS

Further aspects and different examples are further disclosed in detail with the accompanying Figures, in which.

DETAILED DESCRIPTION OF ILLUSTRATIVE EMBODIMENTS

Figure 1:
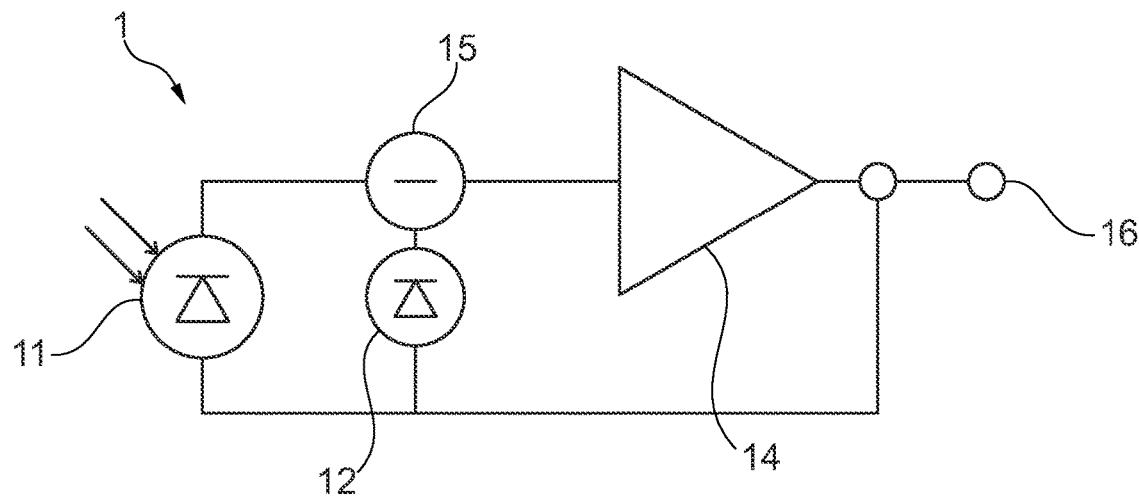
FIG. 1 illustrates an exemplary embodiment of a dark current compensation circuit.

An ambient light sensor is an electronic device that measures the intensity of ambient illumination. It outputs an electrical signal in some elation to the illumination, for example directly proportional to the illumination. However, due to thermal movement and different ambient temperatures, the photodiode used for ambient light measurement provides a small current, even when the photodiode of the sensor itself is not illuminated. This is called dark current. To achieve a dark current cancellation a second photodiode is often used. FIG. 1 illustrates the principle. A cancellation 1 comprises the sensor photodiode 11 and a dark current photodiode 12. The dark current photodiode is shielded such that no measured light can reach the opening of diode 12. In a combiner 15, the dark current of diode 12 is subtracted from the photodiode 11. The result is amplified in amplifier 14 and provided at output 16.

The total response of the exposed photodiode 11 comprises the generated photo current induced by the incident ambient light and the (mostly thermally) generated dark current. The dark current diode 12 only provides the dark current. The cancellation results in an improvement of the sensor sensitivity particular at low illumination levels.

To achieve good results, both photodiode and dark current diode should be similar and arranged close to each other. However, light impinging on a photodiode structure at low angles of incidence or scattered light may reach the dark current diode and create a crosstalk between adjacent structures.

To improve sensitivity, a photodiode array is proposed comprising a plurality of photodiode structures; and a light blocking shield arranged to cover a first portion of the photodiode structures while allowing ambient light to reach a second portion of the photodiode structures, the first portion defining a group of reference photodiodes and the second portion defining a group of exposed photodiodes. The light blocking shield is arranged relative to the photodiode structures such that the light blocking material of the shield covers the reference photodiodes from ambient light while allowing ambient light to reach the remaining photodiode structures such that these are exposed to the ambient light. The shield comprise a light blocking material, such that the light shield blocks at least 90% of light incident on the shield structure or at least 99% of light incident on the shield structure.

In the context of the current disclosure, the phrase "reference diode" or "dark current diode" may be used in relation to a photodiode of a group of photodiode structures that are fully covered by the shield (when viewing the photodiode from a viewing point along the normal of the photodiode).

In the context of the current disclosure, the phrase "exposed diode" or "photodiode" may be used in relation to a photodiode of the group of photodiode structures that are at most partially covered by the shield (when viewing the photodiode from a viewing point along the normal of the photodiode)

Figure 2:
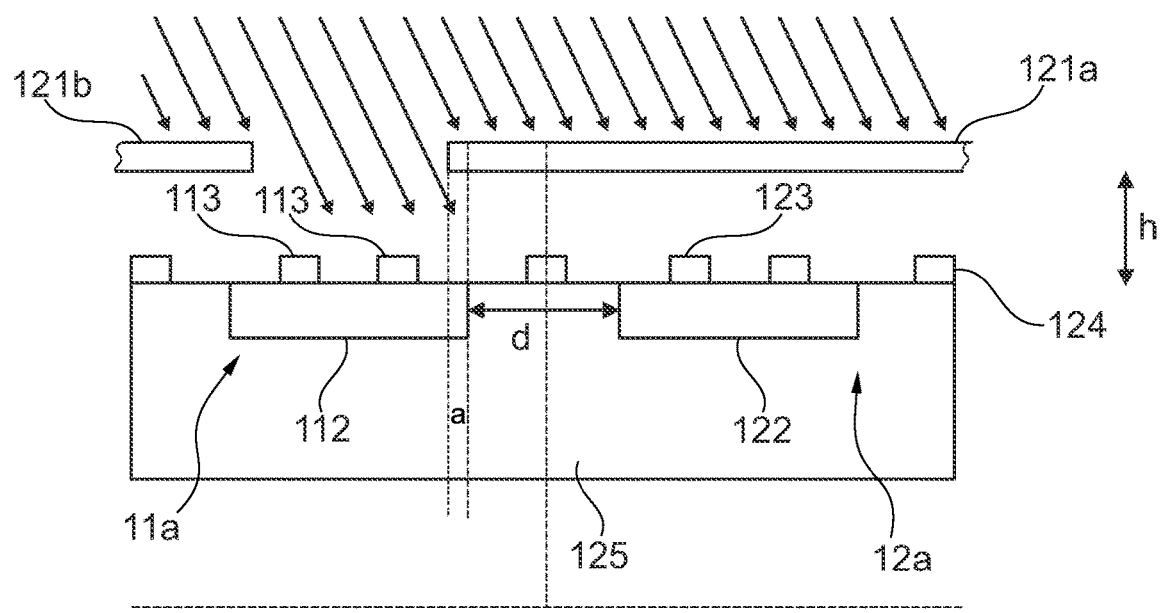
FIG. 2 shows an embodiment of an ambient light sensor in accordance with some aspects of the proposed principle.

FIG. 2 shows an exemplary embodiment to illustrate some aspects. Both diodes are arranged in a common p-substrate 125 adjacent to each other. Each diode comprises of an n-doped well 112 and 122, respectively arranged in the p-doped substrate. Common anode contacts 124 are arranged on the surface to electrically contact substrate 125. Contacts 113 are arranged on n-well 112 to electrically contact the exposed photodiode 11*a*. Likewise, contacts 123 are arranged on well 122 of the reference diode 12*a*.

The reference photodiodes and the exposed photodiodes are preferably physically identical and adjacent to each other at distance d. However, due to manufacturing variances, the lateral diffusion of the n-doped wells 112 and 122 are not well controlled. It may vary from diode to diode, both for photodiodes and reference diodes. As a result, the photo current distribution and dark current distribution may be large.

To reduce the consequences for such distribution, a blocking element, i.e. a light shield 121*a* is arranged over the reference diode 12*a* in accordance with the proposed principle. The area covered by shield 121*a* is larger than the area covered by reference diode 12*a* in the substrate. In other word, as seen in FIG. 2, the lateral dimensions of light shield 121*a* extends in this side view across the lateral dimensions of the reference diode including n-well 122 and the distance d between the photo diode and reference diode. Consequently, the light shield overlaps in lateral direction onto the n-well of photodiode 112. Under the assumption that the lateral area of the photo diode "extends" to half of distance d and likewise reference diode extends to half of distance d, light shield 121*a* covers the area of reference diode 12*a* completely and partially the area of the photodiode, and particular the area with the p-substrate at its surface. The overlap of the light shield across the area of photodiode 11*a* can be a few micrometre. For instance, the distance a can be between 1 μm and 20μ. Likewise, the total overlap can be in the range of 5 μm to 50 μm or more.

The opening of the light shield is therefore smaller than the corresponding area of the photodiode. The light shield 121*a* may comprise aluminium or any other light blocking material. Such light blocking material is often not permeable and will prevent gasses from flowing through the light blocking regions of the shield. The manufacture of the photodiode array often includes annealing steps which may be performed after the light blocking shield is mounted on the light sensor. In order to obtain a similar and an efficient annealing of the photodiode structures the shield is preferably arranged such that there is space for the diffusion flow of the hydrogen between the shield and the photodiode array. Accordingly the light blocking shield 121*a* is arranged at a distance h relative to the reference diode 12*a* to provide such a space between the light blocking shield and the reference diode. The space in between is filled with an annealed photoresist, silicon oxide or any other suitable material. The distance h between the surface of the reference diode 12*a* and the light shield may be a few micrometre. The distance h may depend on the size of the light shield.

In some embodiments, the ratio between the lateral area of one exposed photodiode and the area of the corresponding transparent region, which are not overlapped by the lighting shield is below 0.9, such as below 0.75, such as below 0.5.

Figure 3:
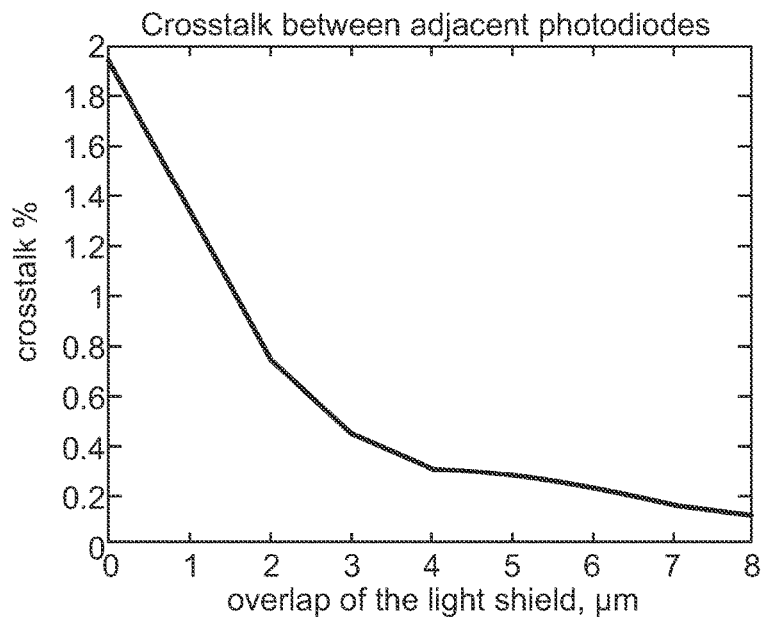
FIG. 3 shows a diagram illustrating the crosstalk versus the overlap of a blocking element.

FIG. 3 shows a diagram illustrating the resulting crosstalk of incident light versus the amount of overlap for a given distance h between the lighting shield and the reference diode. "Crosstalk" in this regard is incident light reaching the reference diode and causing a false signal. As one can see, an increasing overlap reduce the crosstalk significantly. The benefit due to the overlap is still higher than the loss of signal due to the smaller illumination area of the photodiode.

Figure 4:
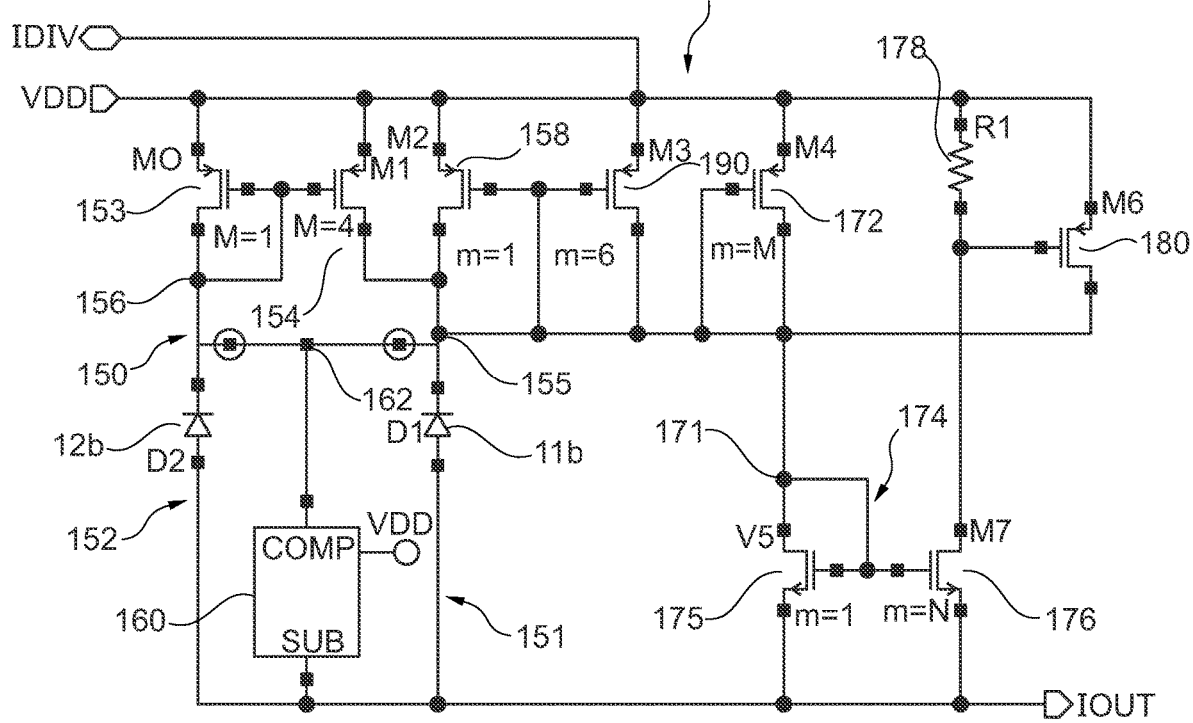
FIG. 4 shows an embodiment of an ambient light detector illustrating some aspects of the proposed principle.

FIG. 4 shows an embodiment of an ambient light detector circuitry illustrating some aspects of the present application. The circuitry comprises a differential amplifier 150 comprising a first signal or current path 151 and a second signal or current path 152. The first signal path includes at least one photodiode 11*b* and a mirror transistor 158 arranged between an output node IOUT and a supply node VDD. The second signal path comprises at least one reference diode 12*b* and a reference transistor 153, both of them also arranged in series between output node IOUT and supply node VDD. As depicted in FIG. 4, there are 5 reference diodes connected in parallel (M=5), of which only one symbol is shown here. Likewise there are 20 photodiodes (M=20) in the first current path, giving the ratio of 1:4.

In operation of the ambient light detector as shown in FIG. 4, a dark current of equal size is generated in each reference diode and photo diode. Consequently, the dark current flowing through the first current path 151 is 4 times larger than the respective dark current through the second current path 152. To compensate the dark current, the differential amplifier using transistors 153 and 154 for compensating the dark current has to cope with the different dark current in the respective paths.

For this purpose the transistors 154 and 153 form a current mirror. Reference transistor 153 and mirror transistor 154 may be implemented as field effect transistors as shown, but different kind of elements like MOS-FETS, BJT, MES-FET can be used depending on the need. The gates of both transistors 153 and 154 are connected to node 156 between the reference diode and reference transistor 153, thereby forming the current mirror. Such current mirror mirrors the current through the reference transistor into the mirror transistor by a predefined ratio. This ratio is given by the physical dimensions of both transistors, given by a parameter M. Such parameter can include the channel width of the transistor, or its length or a combination thereof. In the example of FIG. 4, the current mirrored into transistor 154 is 4 times the current through reference transistor thereby matching the ratio between the numbers of reference diodes and photodiodes. In other words, the dark current through the reference diodes 12*b* in the second current path is mirrored by a factor of 4 into the first current path. It is thus amplified by this factor and now compensates the dark current in the first current path.

The output signal is applied at node 155. Node 155 is also connected to gate of output transistor 158, which is arranged between supply node VDD and node 158. It thus also forms a part of output stage 170 of the amplifier. The output stage 170 also comprises a current mirror stage including path transistor 172, resistor 178 and current mirror 174. Transistor 172 path is connected in series with transistor 175 of current mirror 174 between supply node VDD and output node IOUT. Resistor 178 is connected in series with transistor 176 of current mirror 174 between supply node VDD and output node IOUT. The gates of transistors 175 and 176 are connected to node 171 between transistors 172 and 175, thus mirroring the current through transistor 175 to transistor 176.

Transistor 172 and transistor 158 also comprise a predefined current ratio given by the geometrical parameter m and their respective values m=1 and m=M respectively. In other words, transistor 172's current is M-times larger than transistor 158. Transistors 158 and 172 also form a current mirror with the mirroring ratio 1:M. The current through transistor 158 is mirrored M times into transistor 172. Again, the current through transistor 172 is mirrored into transistor 176 by the same ratio (transistors 175 and 176 also comprise a 1:N ratio as stated in FIG. 4). Consequently in operation the output current at node IOUT equals the photodiode current times the ratio of transistors 172 and 158 (M/1) times the ratio of transistors 176 and 175 (N/1): $I_{out}=I_{photo}*M*N$.

In some instances, the light shield on top of the structure as illustrated in FIG. 2 may introduce some tension within the structure hydrogen left over from the annealing process may change the characteristics of the reference diodes. This could lead to a mismatch between the reference diodes in the second current path and the photodiodes in the first current path. For the mismatch compensation, a compensation circuit 160 is provided. The compensation circuit comprises a DAC providing a compensation signal at node 162. Depending on whether some compensation signal has to be added or subtracted, the output nodes are selectively coupled to the first or the second signal path.

Figure 5:
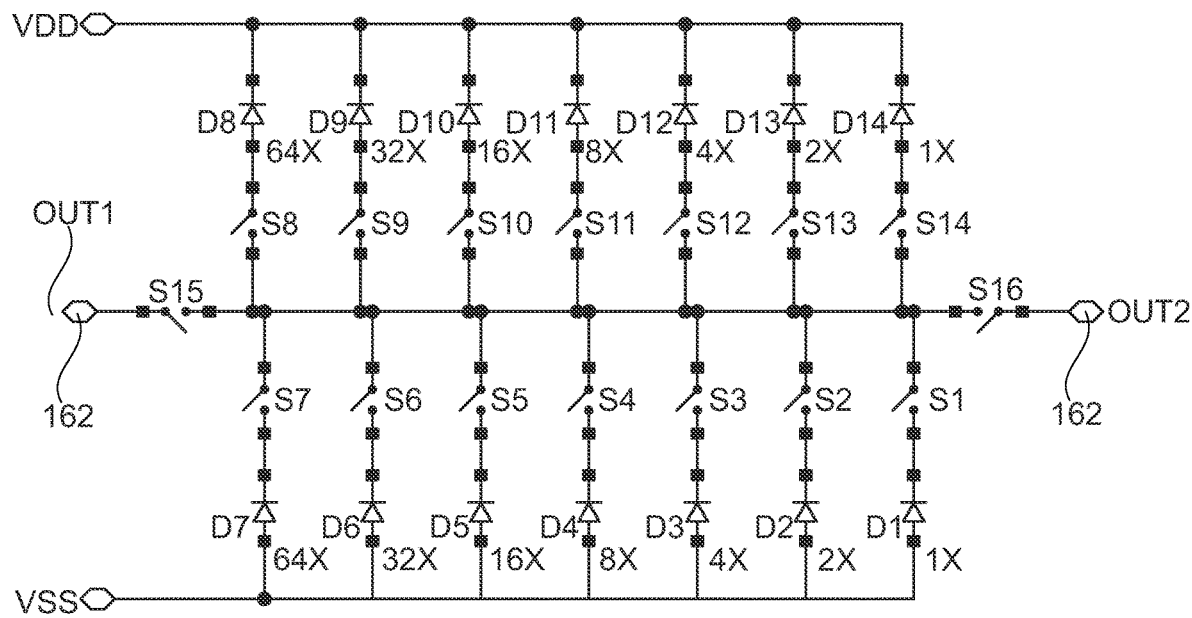
FIG. 5 illustrates an exemplary embodiment of a DAC circuitry to be used in the embodiment of FIG. 4.

Referring to FIG. 5, the DAC may comprise reference node VSS and supply node VDD as well as two output nodes OUT1 and OUT2. These are connected to the first and second current path, respectively. The DAC also comprises a plurality of compensating diodes D1 to D14 and switches S1 to S14. Each diode has a switch connected in series. Diodes D1 to D7 are arranged in parallel with their associated switches in series between reference node VSS and output nodes OUT1/OUT2. Diodes D8 to D14 are arranged with their associated switches in series between supply node VDD and output nodes OUT1/OUT2. Two more switches S15 and S16 are switched to selectively provide the signal from the compensating diodes to the respective output node.

Each compensating diode can thus be selectively switched in or out of the path and provides a signal at one of the output nodes. The area of diodes D1 to D7 (and D14 to D8) is selected such that the area of one diode is half the area of a subsequent diode. Hence, an 8 bit logic signal switches the diode connections can provide 256 different compensation values. Instead of diodes, normal transistors can be used.

Referring back to FIG. 4, another issue may arise, because the current amplifier gain is large and can be in the range of tens of thousands depending on the factor of M*N. In cases of very bright illumination, e.g. by a laser and the like, the output current at node IOUT can be very large causing overheating and damaging to the ambient light detector. To prevent such occurrence the circuit comprises a current limiter. The current limiter uses resistor 178 of the output stage and further comprises a clamping transistor 180. The clamping transistor 180 is arranged between supply node VDD and node 155. The gate of transistor 180 is connected to resistor 178 and transistor 176 of the output stage. In operation the overall output current is sensed by resistor 178. When a voltage drop across resistor 178 reached a predefined threshold, the gate of clamping transistor turns on and provides a clamping signal to current mirror of transistors 158 and 172. The clamping signal set the gate voltage of transistor 158 limiting the overall output to a defined maximum output current value. Such maximum output current value can be set by the threshold voltage of clamping transistor 180,—adjustable by the physical parameter of this transistor-, divided by the value of resistor 178.

In a further aspect, the ambient light detector comprises a selectable gain using a gain setting transistor 190. The ambient light detector may comprise a dynamic LUX range of several orders of magnitude, for instance in the range of 1 m LUX to 100 k LUX. Hence a different range for the output current is required to prevent the detector from reaching the maximum output current values too quickly. In some application for example, the light sensor may be exposed to a high LUX range which requires low gain. This could be for instance on a dashboard in automotive applications. On the other hand, a sensor behind glass of a mobile phone often has lower light intensities and may therefore require a higher gain to achieve the same sensitivity. FIG. 4. Depict an example for two different selectable but also permanent gain settings. The benefit for the gain selectable is that one can reduce the die inventory, and manufacturing of the detector is simplified, because the actual setting can be fixed at a later stage. In the given example, the gain setting transistor is arranged between node 155 and a setting node IDIV. The gate of the gain setting transistor 190 is connected to node 155. In the high gain setting, node IDIV in not bonded to the supply node VDD. In the low gain setting, node IDIV is bonded to the supply node VDD and the gain is reduced by a factor G. In total the output current at the high gain mode is given by $I_{out}=I_{photo}*M*N$. The gain for the low gain mode is given by $I_{out}=I_{photo}*(M/G)*N$.

Figure 6:
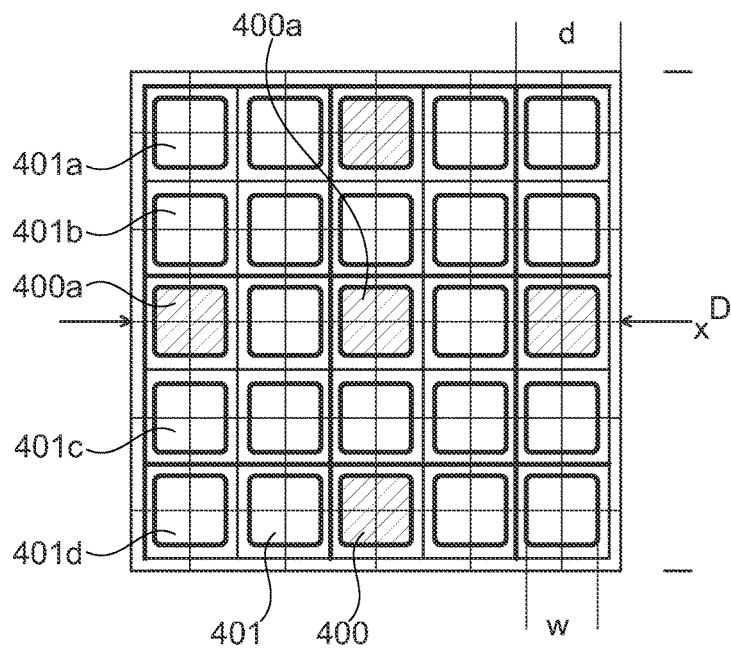
FIG. 6 shows an exemplary embodiment of an ambient light detector array in accordance with some aspects.

Another aspect refers to the arrangement of the reference and photodiodes on a surface of the ambient light detector. FIG. 6 illustrate an example of a top view of an ambient light detector array having a first plurality of photodiodes 401 and second plurality of reference diodes. In the example presented the first plurality is 4 times larger than the second plurality, thereby matching the amplifier arrangement on FIG. 4. The photodiodes and reference diodes are arranged in a pattern having an overall length D. Each diode has the dimension d with an illuminated area of w. The overall layout of photodiodes and reference diodes is common centroid with a reference diode 400a in the centre and further reference diodes along the middle of each edge. This reduces process gradient and variation during manufacturing which improves matching.

Further the ambient light detector array according to the shown example comprises 2 "balanced edges". The number of photodiodes 401 along an edge of the detector is 4 times the number of reference diodes along such edge. For instance, there are 4 photodiodes 401a to 401d along the left edge of the detector and one reference diode 400a in the centre, thereby forming a mirror symmetry through an axis x. In other words, the ratio of the overall numbers of photodiodes and reference diodes matches the ratio of photo diodes and reference diodes along an edge of the detector. This reduces overall chip area of the detector array but maintains the ratio even for leakage current on the edges. The top surface is covered by a transparent material, i.e. an epoxy resin, SOG, or SiO and the like. The light shield covers each of the reference diodes as depicted in this figure by the darker colour. The light shield also expands in its lateral dimensions partly over the adjacent photodiodes (not shown herein) to reduce the cross talk. As the dark current is substantially independent from the level of illumination, not all of the photodiodes needs to be partly covered. As a result, the photo current caused by illumination in diode 401d is slightly larger than photo diode 401c, because the latter photo diode is partly covered. As the photo current due to illumination is summed up in the differential amplifier, small variances between the photodiodes are compensated.

Figure 7:
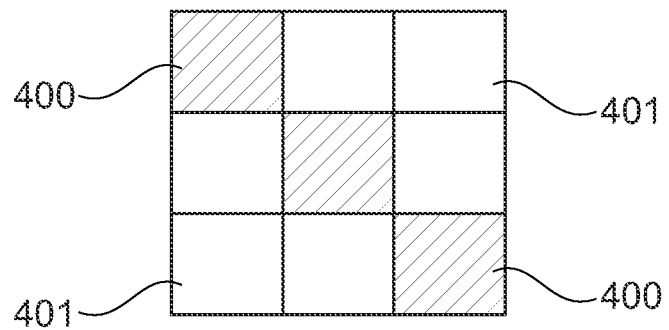
FIG. 7 shows another exemplary ambient light detector array.
Figure 8:
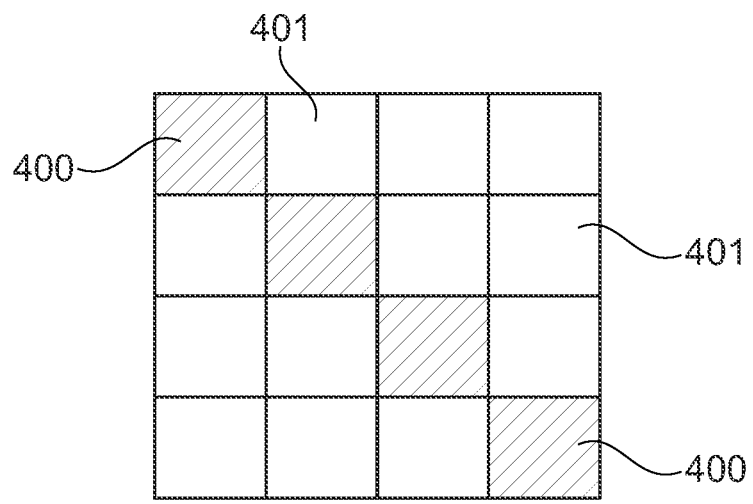
FIG. 8 shows yet another exemplary ambient light detector array.

FIG. 7 shows another example of an ambient light detector array as a 3×3 checkboard. In this embodiment, the ratio between photodiodes and reference diodes is 6:3=2:1. The reference diodes are arranged along a diagonal line within the checkboard arrangement of the detector array. Still, the ratio of photo diodes to reference diodes along an edge of the detector array is 2:1. A similar example is shown in FIG. 8, illustrating an ambient light detector array having a 4×4 arrangement. Reference diodes 400 are again arranged along a diagonal line of the board, while the photodiodes 401 occupy the remaining space. The ratio of photo diodes and reference diodes along an edge of the array equals 3:1.

Hence, to maintain the same overall ratio also as the ratio of diode along the edge, one has to arrange all reference diodes across one of the diagonals of the ambient light detector array.

Figure 9:
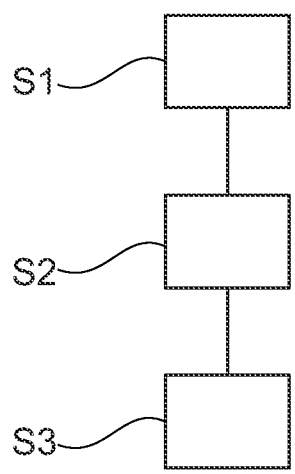
FIG. 9 shows an example of a method of forming an ambient light sensor.

FIG. 9 illustrates some aspect of a method of forming an ambient light sensor. In step S1, a substrate layer of a first conductivity type is provided, the layer having a main surface. The layer can be for example p-doped and formed of GaAs, GaN or any other suitable material. In step S2 several areas of a second conductivity type are deposited on or in the substrate layer laterally adjacent to each other and separated by a first distance. The formed areas can form in top view a checkboard, for example an N×N checkboard, wherein N is an integer larger than 2. Each area contains the second conductivity type area surrounded by a border of the substrate layer.

Between the second conductivity type area and the substrate layer a pn-junction is formed. The areas can be formed by depositing an n-dopant into the substrate layer. Alternatively one or more recesses can be etched into the p-doped layer. The recesses can then be filled with the n-doped material. Other alternatives to form a pn-junction using photodiode or LED manufacturing techniques can be used.

After forming the n-type well in the substrate layer, both the substrate layer and the n-well are electrically contacted in step S2. For this purpose, contacts are deposited on the surface. One or more common contact can be arranged on the area of the substrate layer between two adjacent n-type wells. The contacts are formed of metal or a transparent conducting material like ITO. The contact are coupled to a read out and amplifier circuitry, which is either provided separately or integrally formed on the layer substrate.

Finally, in step S3, a light shield element is formed over one or more areas. This light shield is placed such that its lateral dimensions are larger than one of the defined areas and as such the light shield covers an area completely and also extends partially into adjacent areas. The light shield can be of any in-transparent material, like dark resin and such. Metal, preferably with limited reflection can be used as well. Prior to forming the light shield, the array with the formed diodes can be covered by a transparent material completely, like SOG, SiO and the like. The light shield element covers only a portion of the areas, such that the amount of areas not covered is larger than the amount covered. The light shield can also be deposited only over specific and dedicated areas, thus in top view covering a diagonal of the array.

What is claimed is:

1. An ambient light sensor comprising:
   a first plurality of sensor elements, each sensor element configured to provide a signal in response to a level of illumination; and
   a second plurality of reference elements, each reference element configured to provide a reference signal and each comprising a blocking element configured to shield the respective reference element from being illuminated,
   wherein the first plurality is larger than the second plurality and the first plurality of sensor elements and the second plurality of reference elements are arranged in an array, and
   wherein a sensor element and a reference element are laterally arranged on, or in, a common layer substrate and share at least one common first contact.

2. The ambient light sensor of claim 1, wherein second contacts for the reference elements are arranged on a surface of the reference elements facing the blocking element.

3. The ambient light sensor of claim 2, wherein the second contacts for the sensor elements and/or the reference elements are arranged on a surface of common layer substrate facing away from the blocking element.

4. The ambient light sensor of claim 1, wherein second contacts for the sensor elements are arranged on a surface of the sensor elements facing the blocking element.

5. The ambient light sensor of claim 1, wherein the common contact is arranged on a surface of the common layer substrate facing away from the blocking element.

6. The ambient light sensor of claim 1, wherein, for a top view onto the light sensor, the blocking element is larger than the respective reference element.

7. The ambient light sensor of claim 1, wherein the blocking element extends over a portion of a sensor element of the first plurality of sensor elements adjacent to the reference element.

8. The ambient light sensor of claim 7, wherein the portion of the sensor element covered by the blocking element is between 5% and 50% of a total sensor area of the sensor element.

9. The ambient light sensor of claim 1, wherein the first plurality is 4 times the second plurality.

10. The ambient light sensor of claim 1, wherein the sensor elements and the reference elements each comprise a p-doped layer, an n-doped layer and an active area in between configured to generate the signal when being illuminated.

11. The ambient light sensor of claim 1, wherein the sensor elements and/or the reference elements each comprise a well arranged in the common substrate to form an active layer between the well and the common substrate.

12. The ambient light sensor of claim 1, wherein the blocking element is arranged distally apart from a main surface of the reference element.

13. The ambient light sensor of claim 1, wherein the sensor elements and the reference elements are arranged in an array, such that a ratio of sensor elements and reference elements along an edge of the array corresponds to a ratio between the first plurality and the second plurality.

14. The ambient light sensor of claim 1, wherein each blocking element completely covers the respective reference element and extends laterally between the respective reference element and at least one sensor element of the first plurality of sensor elements.

15. An ambient light detector array comprising:
a first plurality of photodiodes; and
a second plurality of reference diodes, the first plurality being different from the second plurality and arranged laterally to each other such that a ratio of a number of photodiodes and a number of reference diodes along an edge of the array corresponds to a ratio between the first plurality and the second plurality.

16. The ambient light detector array, of claim 15, wherein the first plurality and the second plurality are arranged to form an N×N pattern, wherein N is an integer larger than 2.

17. The ambient light detector array of claim 15, wherein each corner of the array comprises a photodiode of the first plurality of photodiodes.

18. The ambient light detector array of claim 15, wherein the second plurality of reference diodes are arranged in a diagonal across the array.

19. The ambient light detector array of claim 15, wherein the first plurality of photodiodes is four times larger than the second plurality of reference diodes.

20. A method of forming an ambient light sensor, the method comprising:
providing a layer of a first conductivity type, the layer having a main surface;
forming at least two areas of a second conductivity type on or in the layer laterally adjacent to each other and separated by a first distance;
forming contacts to contact the layer and each of the at least two areas; and
forming a light shield element over one of the at least two areas substantially parallel to the main surface, such that the light shield covers the one of the at least two areas and extends at least along the distance.

\* \* \* \* \*